(12) United States Patent
Deberling et al.

(10) Patent No.: US 10,543,825 B2
(45) Date of Patent: Jan. 28, 2020

(54) BRAKE BOOSTER FOR A MOTOR VEHICLE

(71) Applicant: Robert Bosch GmbH, Stuttgart (DE)

(72) Inventors: Andreas Deberling, Erdmannhausen (DE); Andreas Ohm, Kupferzell (DE); Markus Baur, Gestratz (DE); Willi Nagel, Remseck/Hochdorf (DE)

(73) Assignee: Robert bosch GmbH, Stuttgart (DE)

( * ) Notice: Subject to any disclaimer, the term of this patent is extended or adjusted under 35 U.S.C. 154(b) by 0 days.

(21) Appl. No.: 15/759,804

(22) PCT Filed: Jul. 18, 2016

(86) PCT No.: PCT/EP2016/067040
§ 371 (c)(1),
(2) Date: Mar. 13, 2018

(87) PCT Pub. No.: WO2017/045808
PCT Pub. Date: Mar. 23, 2017

(65) Prior Publication Data
US 2018/0257624 A1 Sep. 13, 2018

(30) Foreign Application Priority Data
Sep. 14, 2015 (DE) .......................... 10 2015 217 547

(51) Int. Cl.
*B60T 13/74* (2006.01)
*F16H 25/24* (2006.01)
*F16H 25/20* (2006.01)

(52) U.S. Cl.
CPC ............ *B60T 13/745* (2013.01); *F16H 25/24* (2013.01); *F16H 2025/2046* (2013.01); *F16H 2025/2081* (2013.01); *F16H 2025/249* (2013.01)

(58) Field of Classification Search
CPC ....... B60T 13/74; B60T 13/745; B60T 8/4077
(Continued)

(56) References Cited

U.S. PATENT DOCUMENTS 4,790,201 A * 12/1988 Gheddo ............... B62D 33/067
74/89.37
8,899,696 B2 * 12/2014 Weiberle ................... B60T 1/10
303/113.4

(Continued)

FOREIGN PATENT DOCUMENTS

DE        19831940 A1    1/2000
DE    102012014361 A1    1/2014
(Continued)

OTHER PUBLICATIONS

International Search Report dated Sep. 28, 2016 of the corresponding International Application PCT/EP2016/067040 filed Jul. 18, 2016.

*Primary Examiner* — Christopher P Schwartz
(74) *Attorney, Agent, or Firm* — Norton Rose Fulbright US LLP; Gerard Messina

(57) ABSTRACT

A brake booster for a main brake cylinder of a motor vehicle includes a drive motor connected or connectable to a pressure piston for the main brake cylinder via a gear unit, where the gear unit includes a rotatable spindle nut, including a female thread and an axially displaceable, but rotatably fixed, spindle rod that includes a male thread, the male and female threads engaging into each other in order to convert a rotary motion of the drive motor into a translational motion of the spindle rod for actuating the pressure piston. The spindle nut is formed as two pieces and includes an inner part including the female thread and an outer part including an outer toothing, the inner and outer parts being made of different materials.

18 Claims, 3 Drawing Sheets

(58) Field of Classification Search
USPC ......... 303/113.2, 113.4, 114.1, 115.2, 114.3; 60/545
See application file for complete search history.

(56) References Cited

U.S. PATENT DOCUMENTS

| | | | | |
|---|---|---|---|---|
| 2010/0126167 | A1* | 5/2010 | Nagel | B60T 7/042 60/545 |
| 2012/0192556 | A1* | 8/2012 | Verhagen | B60T 8/38 60/585 |
| 2012/0200009 | A1* | 8/2012 | Verhagen | B21D 15/10 264/527 |
| 2016/0068147 | A1* | 3/2016 | Hatt | F16H 25/2003 74/409 |
| 2018/0251114 | A1* | 9/2018 | Deberling | B60T 13/745 |
| 2018/0304876 | A1* | 10/2018 | Ohm | B60T 13/745 |
| 2019/0047532 | A1* | 2/2019 | Ohm | B60T 13/745 |

FOREIGN PATENT DOCUMENTS

| | | |
|---|---|---|
| DE | 102013006795 A1 | 10/2014 |
| DE | 102014101995 A1 | 1/2015 |
| EP | 0252700 A2 | 1/1988 |
| EP | 277097 A1 | 8/1988 |
| JP | 2001513179 | 8/2001 |
| JP | 2010184699 A | 8/2010 |
| JP | 2014529508 A | 11/2014 |

\* cited by examiner

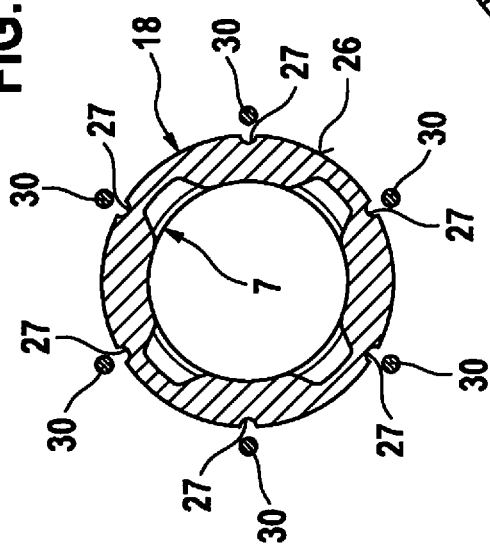
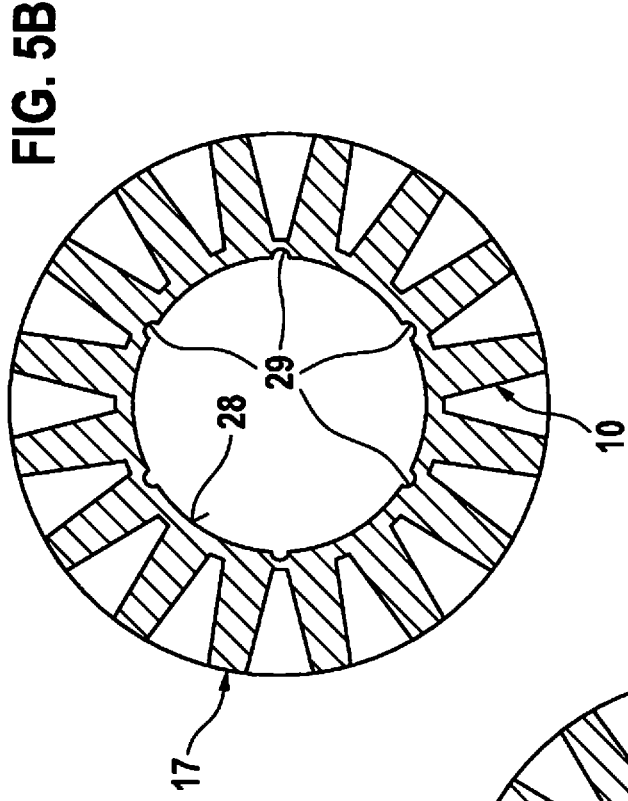
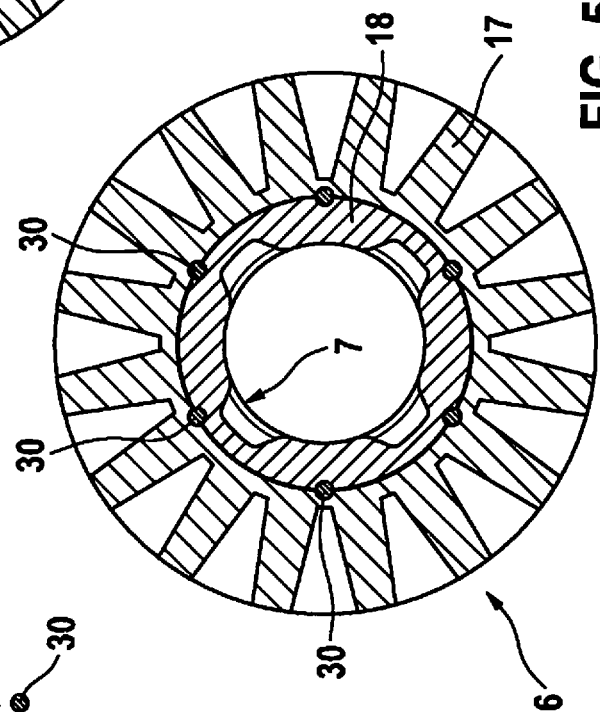

BRAKE BOOSTER FOR A MOTOR VEHICLE

CROSS-REFERENCE TO RELATED APPLICATIONS

The present application is the national stage of International Pat. App. No. PCT/EP2016/067040 filed Jul. 18, 2016, and claims priority under 35 U.S.C. § 119 to DE 10 2015 217 547.2, filed in the Federal Republic of Germany on Sep. 14, 2015, the content of each of which are incorporated herein by reference in their entireties.

FIELD OF THE INVENTION

The present invention relates to a brake booster for a main brake cylinder of a motor vehicle, the brake booster including a drive motor connected/connectable via a gear unit to a pressure piston for the main brake cylinder, the gear unit including a rotatable spindle nut including a female thread and an axially displaceable, rotatably fixed spindle rod including a male thread, the female thread being engaged with the male thread in order to convert a rotary motion of the drive motor into a translational motion of the spindle rod for actuating the pressure piston.

BACKGROUND

Brake boosters and brake units are already known from the related art. Unexamined patent application DE 10 2012 014 361 A1, for example, describes a brake booster for a main brake cylinder of a motor vehicle, which includes a drive motor and a gear unit connecting the drive motor to a pressure piston of the main brake cylinder. In this case, the gear unit includes a section which is designed as a spindle gear unit in order to convert a rotary motion of the drive motor into a translational motion of the pressure piston for actuating the main brake cylinder. For this purpose, the spindle gear unit includes a spindle nut including a female thread and a spindle rod including a male thread, the two threads engaging into each other in order to convert a rotary motion into a translational motion.

SUMMARY

The present invention provides a brake booster where the spindle nut of the gear unit has a longer service life and the operational reliability of the brake booster is increased. According to example embodiments of the present invention, the spindle nut also includes an outer toothing in addition to the female thread. As a result, the spindle nut is drivable, in particular directly, by yet another gear wheel. In particular, the present invention makes it possible for the spindle nut to also be utilized for a purpose other than only for converting a rotary motion into a translational motion. According to an example embodiment, the present invention, it is provided, for this purpose, that the spindle nut is formed as two pieces and includes an inner part including the female thread and an outer part including an outer toothing, the inner part and the outer part being made of different materials. Due to the advantageous two-pieced formation, it is possible to optimize the outer toothing as well as the female thread in terms of the materials utilized, thereby achieving a long service life of the brake booster.

According to a preferred example embodiment of the present invention, it is provided that the outer part is made of a high-strength material, in particular of aluminum, steel, ceramic, a fiber composite material, and/or a fiber-reinforced plastic. Therefore, the outer part is designed to be particularly strong and allows for high drive forces.

Moreover, according to a particularly preferred example embodiment, the inner part is made of a low-friction and/or low-wear material, in particular of polyoxymethylene, polytetrafluorethylene, and/or polyamide. As a result, in particular, the friction between the female thread and the male thread is reduced and the drive force applied by the drive motor is converted essentially into a translational motion of the spindle rod, with minimal friction, whereby the efficiency of the gear unit is improved.

Moreover, it is preferably provided that the outer part and the inner part are axially connected to each other in a form-locked manner. As a result, it is ensured in an easy way that an axial load occurring during operation can be reliably absorbed or transferred, and that the spindle nut reliably transfers a drive force onto the spindle rod even during great loads or at high torques. Due to the form-locked connection, the outer part and the inner part are easily prevented from becoming disconnected.

According to a preferred example embodiment of the present invention, the axial form-locked connection is formed by way of at least one bent holding section. The bent holding section can be a component of the inner part or of the outer part in this case. In an example, at least one bent holding section is situated on the inner part and at least one bent holding section is situated on the outer part. Due to the bent holding section, a form-locking element is available, which is formed as one piece with the particular part and ensures that the elements are securely locked to each other. The particular holding section is bent in such a way that it engages axially over the particular other part, i.e., either the inner part or the outer part, in order to form the form-locked connection.

According to a preferred example embodiment of the present invention the axial form-locked connection is formed by way of at least one screw which is axially screwed into one of the parts, the screw head of the screw extending over the other part. According to this specific embodiment, a subsequent reshaping of one of the parts can be dispensed with. Instead, one of the parts is advantageously provided with a screw thread, into which the screw is screwable. In this case, the screw thread is situated in such a way and the screw head of the screw is designed in such a way that the screw head, in the screwed-in state, extends over the other part and thereby produces an axial form-locked connection between the two parts.

Moreover, in a preferred example embodiment, the parts are connected to each other in a force-locked, form-locked, and/or integrally joined manner for the rotatably fixed connection. As a result, it is ensured that high torques can be transmitted without the two parts rotating relative to each other.

It is particularly preferred when the form-locked connection of the rotatably fixed connection is formed by way of at least one coupling bolt which is located in oppositely positioned recesses of the inner part and of the outer part in a form-locked manner. The outer part and the inner part therefore each includes at least one recess, in particular a receiving groove, into which the coupling bolt is radially insertable. If the two recesses are located opposite each other, the coupling bolt is axially insertable into the recesses which are preferably open at the edge, at least toward one axial side. A force transmission in the circumferential direction then takes place from one part to the other part by way of the coupling bolt. As a result, a reliable, rotatably fixed connection between the outer part and the inner part is permanently ensured.

According to a preferred example embodiment of the present invention, the form-locked connection for the rotatably fixed connection is formed by way of at least one radial projection of one of the parts, which engages into a radial recess of the other part. In this specific embodiment, additional force-transmission means can be advantageously dispensed with.

Although the manufacture of the outer part and the inner part becomes more complex in this case, a simple assembly is ensured. In particular, the one part includes multiple radial projections and/or radial recesses which are uniformly distributed around the circumference of the part and are formed in the manner of a toothing in order to also be capable of reliably transmitting high forces.

Moreover, the outer toothing of the spindle nut is preferably engaged with an inner toothing of a drive internal gear of the gear unit, the spindle nut being axially displaceable relative to the drive internal gear. The spindle nut is therefore located in the drive internal gear and penetrates it. As a result, a particularly compact specific embodiment of the gear unit is ensured. Due to the advantageous design, according to which the spindle nut is axially displaceable relative to the drive internal gear, it is also ensured that, when a user (mechanically) applies a force directly onto the pressure piston via a brake pedal actuation and the drive motor cannot adjust the gear unit rapidly enough, the pressure piston is displaceable independently of the drive by way of the axial displacement of the spindle nut. Therefore, a braking operation can be (mechanically) triggered or initiated even in the event of an error, for example a failure of the drive motor. This is advantageous, in particular, when the pressure piston forms the spindle rod or when the pressure piston, as a direct extension of the spindle rod, may be mechanically acted upon by the spindle rod. In particular, the inner toothing and the outer toothing are designed in such a way that the teeth in each case extend axially along the spindle nut or the drive internal gear. As a result, an axial displacement of the spindle nut relative to the drive internal gear is possible without the spindle nut being rotated relative to the drive internal gear.

The present invention and its advantages are further explained with reference to the drawings.

BRIEF DESCRIPTION OF THE DRAWINGS

FIGS. 5A through 5C show yet another advantageous example embodiment of the spindle nut.

DETAILED DESCRIPTION

Figure 1B:
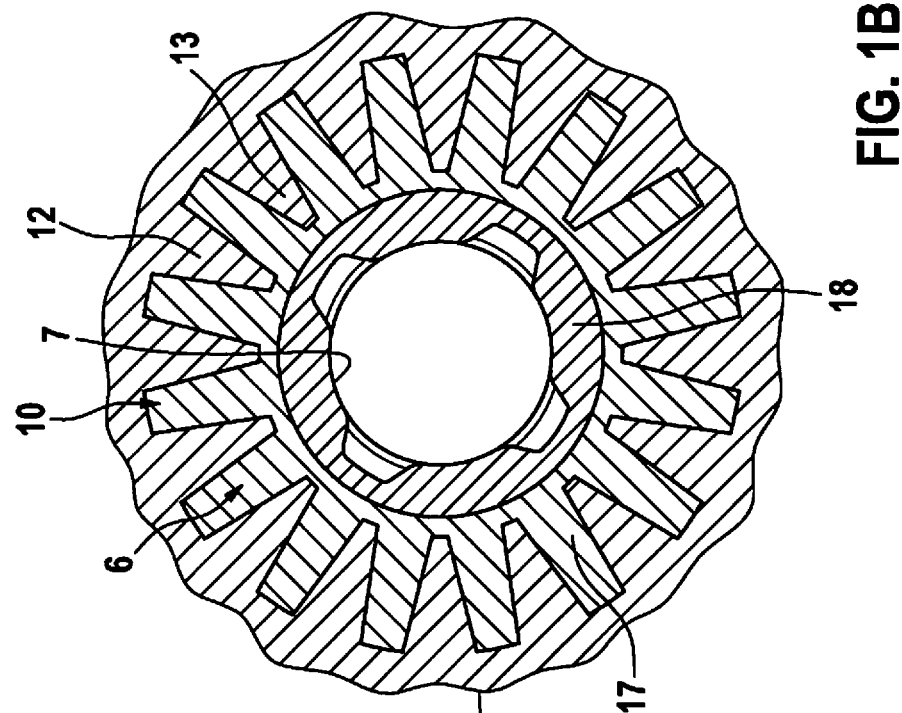
FIGS. 1A and 1B show a simplified representation of a brake booster according to an example embodiment of the present invention.
Figure 1A:
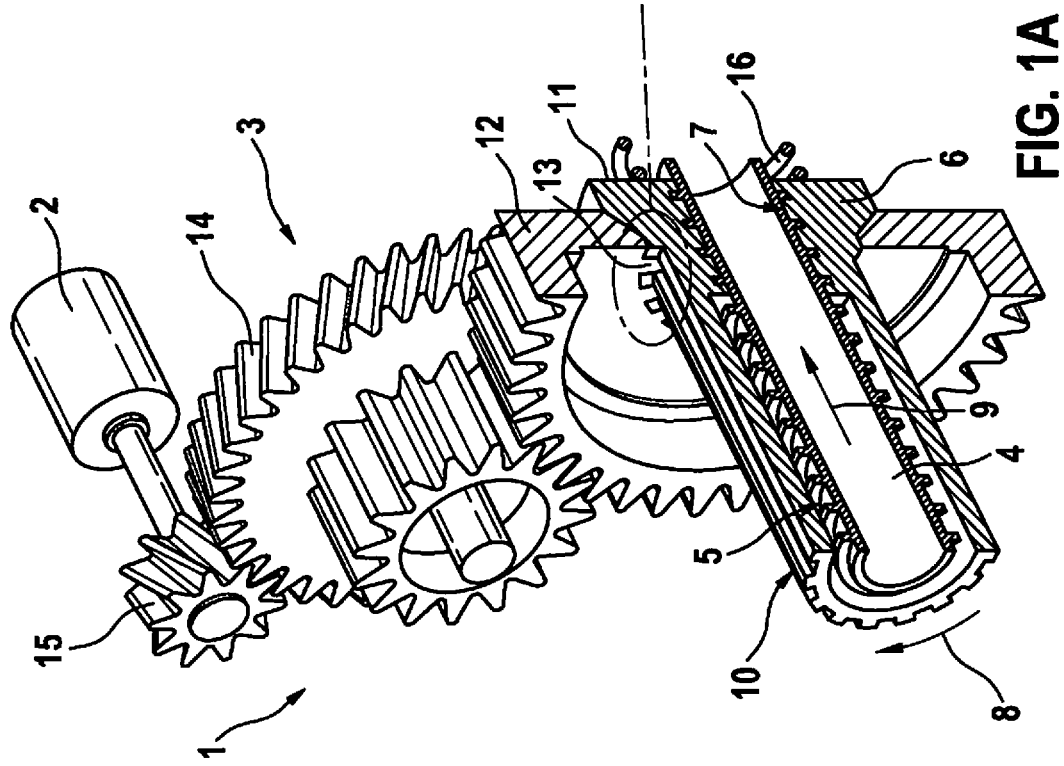

FIG. 1 shows, in a simplified representation, a brake booster 1 for a main brake cylinder of a motor vehicle, which is not represented here in greater detail. Brake booster 1 includes a drive motor 2 represented here in a simplified manner, which is designed as an electric motor, and is operatively connected via a gear unit 3 to a spindle rod 4. Only sections of spindle rod 4 are represented here, in a longitudinal section. Spindle rod 4 is designed as a hollow rod which includes a male thread 5. Spindle rod 4 is axially mechanically connected at one end to the main brake cylinder, in particular to a pressure piston of the main brake cylinder, and, at the other end, to a brake pedal of the motor vehicle including brake booster 1. Spindle rod 4 is designed to be axially displaceable in this case, in order to apply a force onto the main brake cylinder for its actuation when the brake pedal is actuated.

A spindle nut 6 is rotatably situated on spindle rod 4. Spindle nut 6 includes, in sections, a female thread 7 which is engaged with male thread 5. Male thread 5 and female thread 7 are each formed as a trapezoidal thread in this case. As viewed axially, male thread 5 extends across a section which is more than twice as great as that of female thread 7. If spindle nut 6 is set into rotary motion, as indicated by an arrow 8, this results in an axial displacement of spindle rod 4 due to the mutually engaging trapezoidal threads, as indicated by arrow 9. Spindle rod 4 can also form the pressure piston.

Spindle nut 6 also includes an outer toothing 10 including multiple teeth extending axially across an outer lateral surface of a sleeve-shaped section of spindle nut 6. Moreover, spindle nut 6 includes, at one end, an axial stop 11 which has a conical longitudinal section.

Gear unit 3 also includes a drive internal gear 12 which includes an inner toothing 13 engaged with outer toothing 10. Due to the fact that outer toothing 10 and inner toothing 13 are axially oriented, spindle nut 6 is axially displaceable relative to drive internal gear 12. Moreover, drive internal gear 12 includes an outer toothing, via which drive internal gear 12 is operatively connected to an intermediate gear 14 which has a gear ratio and meshes with a drive pinion 15 of electric motor 2.

If electric motor 2 is activated, a torque is applied onto drive internal gear 12 which entrains spindle nut 6 due to female thread 13 and sets the spindle nut into rotary motion. Since piston rod 4 is rotatably fixedly mounted, the rotation of spindle nut 6 produces an axial motion of piston rod 4 and, therefore, of the pressure piston, and actuates the main brake cylinder. As a result, an automatic braking operation can be initiated or the driver can be assisted by way of the generation of an additional braking force. If the driver actuates the brake pedal faster than electric motor 2 can respond, or when electric motor 2 or brake booster 1 has a defect, it is possible for the driver to actuate spindle rod 4 purely mechanically due to the axial displaceability of spindle nut 6 relative to drive internal gear 12. In this case, spindle nut 6 is pressed axially through drive internal gear 12. Spindle nut 6, including axial stop 11, is pressed against drive internal gear 12 by way of a spring element 16, so that axial stop 11 rests against drive internal gear 12 and a further displacement is impossible. In this regard, gear unit 3 is preloaded by way of spring element 16 in the direction of a starting state.

FIG. 1B shows one advantageous embodiment of spindle nut 6, in a cross-sectional representation through drive internal gear 12. Spindle nut 6 is formed as two pieces in the present case, including an outer part 17 and an inner part 18, which are fixedly connected to each other axially and in the direction of rotation. In this case, outer part 17 includes outer toothing 10 and inner part 18 includes female thread 7.

Spindle rod 4 is not shown in FIG. 1B, for the sake of clarity. In the present case, inner part 18 and outer part 17 are each designed in the shape of a sleeve and are situated concentrically to each other.

Figure 2:
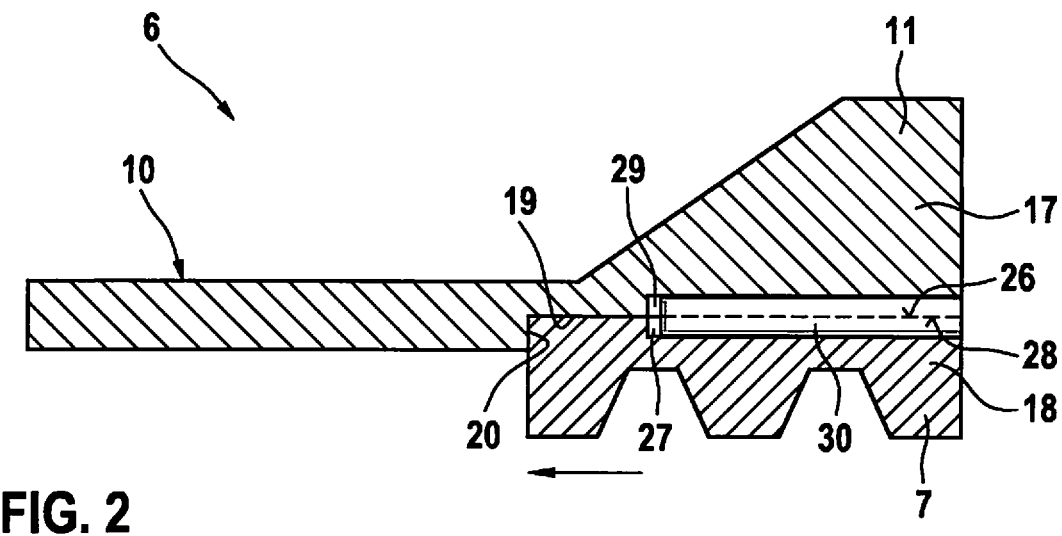
FIG. 2 shows an enlarged sectional representation of a spindle nut of a brake booster according to an example embodiment of the present invention.

FIG. 2 shows, in a longitudinal sectional representation, an enlarged section of spindle nut 6. It is apparent that outer part 17 has an enlarged diameter in the area of axial stop 11 for the formation of an axial receptacle 19. Inner part 18, including female thread 7, is inserted into axial receptacle 19, inner part 18 having an outer diameter which at least essentially corresponds to the enlarged inner diameter. Due to the enlarged inner diameter, axial receptacle 19 forms an axial stop 20 in this case, up to which inner part 18 is insertable, as indicated by an arrow. Outer part 17 is made of a high-strength material, such as aluminum or steel. In the present case, inner part 18 is made of a low-friction material, such as polyoxymethylene or polyamide. Therefore, the spindle nut is made of an advantageous hard material in the safety-relevant external area and, in the tribologically relevant internal area, is made of a tribologically optimized material. Due to the two-piece design, it is therefore possible to optimally adapt spindle nut 6 to its different tasks.

Different variants are conceivable for fastening inner part 18 in outer part 17. In the simplest case, inner part 18 is bonded into outer part 17. It is also conceivable to weld outer part 17 and inner part 18 to each other. Preferably, it is provided that outer part 17 and inner part 18 are held against each other in a form-locked manner. A first form-locked connection is already formed in the axial direction by an axial stop 20. Advantageously, a form-locked connection is also provided in the other direction, as shown with reference to FIGS. 3 and 4, by way of example.

Figure 3:
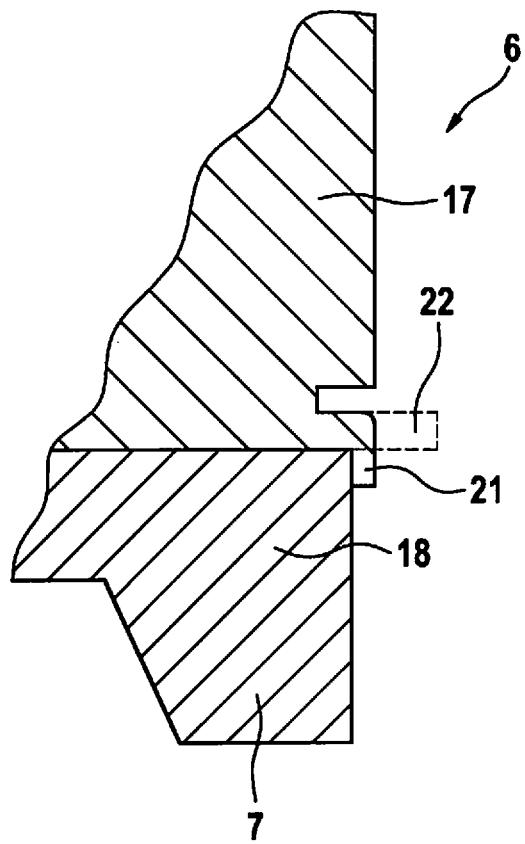
FIG. 3 shows one first advantageous refinement of the spindle nut according to an example embodiment of the present invention.

FIG. 3 shows an example embodiment in which the axial form-locked connection is formed by way of a bent holding section 21 of outer part 17. For this purpose, outer part 17 includes, on its front side, an axially protruding web 22 extending across the entire circumference with or without interruptions. At least one web 22 is provided in this case, which extends axially over the circumference, at least in some areas. After the insertion of inner part 18, web 22 is bent radially inward, at least in sections, and is thereby plastically deformed, so that the web overlaps the front side of inner part 18. Therefore, inner part 18 is axially secured, in a form-locking manner, between axial stop 20 and holding section 21 formed by the bent web.

Figure 4:
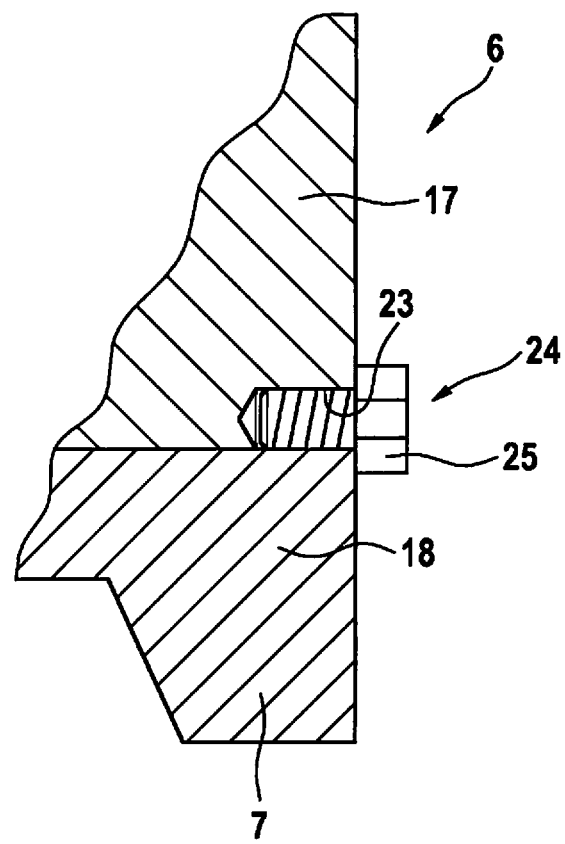
FIG. 4 shows yet another advantageous refinement of the spindle nut according to an example embodiment of the present invention.

FIG. 4 shows an alternative example embodiment in which outer part 17 includes, in its front side, one or multiple openings including a screw thread 23. The openings are formed radially preferably far inward or close to the enlarged inner diameter in this case, so that a screw 24, which has been screwed into thread 23, overlaps inner part 18, which has been inserted into axial receptacle 19, via its screw head 25.

For the rotatably fixed, form-locked connection between outer part 17 and inner part 18, it is preferably provided that inner part 18 and outer part 17 include a mutually engaging toothing, by way of which a simple form-locked connection in the direction of rotation is established. Alternatively, inner part 18 or outer part 17 can include one single radial projection which engages into a corresponding radial receptacle of inner part 18, which is designed to be complementary to the radial projection.

FIGS. 5A-5C show an exemplary embodiment in which the form-locked connection is formed in the direction of rotation by additional elements. In this case, inner part 18 includes, on its outer lateral side 26, multiple recesses 27 uniformly distributed around the circumference and in the form of longitudinal grooves which extend axially across inner part 18, as shown in FIG. 5A.

FIG. 5B shows a top view of outer part 17 which includes, on its inner lateral side 28 having the enlarged inner diameter, multiple recesses 29 distributed around the circumference and in the form of longitudinal grooves that extend axially. In this case, the number of recesses 29 corresponds to the number and arrangement of recesses 27 of inner part 18. If inner part 18 is inserted into outer part 17, as shown in FIG. 5C, recesses 29 and 27 lie opposite each other, in at least one rotation position of inner part 18 in outer part 17, so that the inner part and the outer part, together, each form an axial receptacle of spindle nut 6. According to FIG. 5C, a coupling bolt 30 has been axially inserted into the axially open-edged axial receptacles formed from recesses 27 and 29, as shown in FIGS. 5A and 5C, by way of example. The cross section of coupling bolt 30 corresponds, in this case, at least essentially to the cross section of the axial receptacles which are formed by recesses 27 and 29. Therefore, in the installed state according to FIG. 5C, coupling bolt 30 lies both in recess 27 and in recess 29, thus ensuring a simple, form-locked connection of outer part 17 to inner part 18.

Further advantages and preferred features result from the above description, as well as from the following claims.

What is claimed is:

1. A brake booster for a main brake cylinder of a motor vehicle, the brake booster comprising:
 a gear unit; and
 a drive motor that is connectable to a pressure piston for the main brake cylinder via the gear unit;
 wherein the gear unit includes:
  a rotatable spindle nut formed as two pieces, the two pieces including an inner part of a first material and that includes a female thread and an outer part of a second material, different than the first material, and that includes an outer toothing; and
  an axially displaceable, rotatably fixed spindle rod including a male thread engaging the female thread, by which engagement a rotary motion of the drive motor is convertible into a translational motion of the spindle rod for actuating the pressure piston;
  wherein the outer toothing of the spindle nut is engaged with an inner toothing of a drive internal gear of the gear unit, the spindle nut being axially displaceable relative to the drive internal gear.

2. The brake booster of claim 1, wherein the second material includes at least one of aluminum, steel, ceramic, a fiber composite material, and a fiber-reinforced plastic.

3. The brake booster of claim 2, wherein the first material is at least one of a low-friction material and a low-wear material.

4. The brake booster of claim 2, wherein the first material includes at least one of polyoxymethylene, polytetrafluoroethylene, and polyamide.

5. The brake booster of claim 1, wherein the outer part and the inner part are axially connected to each other in a form-locked manner.

6. The brake booster of claim 5, wherein the axial form-locked connection is formed by way of a bent holding section.

7. The brake booster of claim 5, wherein the axial form-locked connection is formed by a screw that is axially screwed into one of the inner and outer parts, with a lead of the screw projecting over the other of the inner and outer parts.

8. The brake booster of claim 1, wherein the inner part and the outer part are connected to each other in at least one of a force-locked, form-locked, and integrally joined manner for a rotatably fixed connection.

9. The brake booster of claim 8, wherein the form-locked connection is formed by way of a coupling bolt located in oppositely positioned recesses of the inner part and of the outer part in a form-locked manner.

10. The brake booster of claim 8, wherein the form-locked connection is formed by way of at least one radial projection of one of the inner and outer parts part that engages into a radial recess of the other of the inner and outer parts.

11. The brake booster of claim 1, wherein the second material is stronger than the first material.

12. The brake booster of claim 1, wherein the first material is at least one of a low-friction material and a low-wear material.

13. The brake booster of claim 1, wherein the first material includes at least one of polyoxymethylene, polytetrafluorethylene, and polyamide.

14. A brake booster for a main brake cylinder of a motor vehicle, the brake booster comprising:
    a gear unit; and
    a drive motor that is connectable to a pressure piston for the main brake cylinder via the gear unit;
    wherein the gear unit includes:
        a rotatable spindle nut formed as two pieces, the two pieces including an inner part of a first material and that includes a female thread and an outer part of a second material, different than the first material, and that includes an outer toothing; and
        an axially displaceable, rotatably fixed spindle rod including a male thread engaging the female thread, by which engagement a rotary motion of the drive motor is convertible into a translational motion of the spindle rod for actuating the pressure piston;
    wherein the outer part and the inner part are axially connected to each other in a form-locked manner; and
    wherein the axial form-locked connection is formed by way of a bent holding section.

15. The brake booster as recited in claim 14, wherein the outer part includes an axially protruding web which is bent radially inwardly so that the web overlaps the inner part and forms the bent holding section.

16. The brake booster as recited in claim 15, wherein the web extends over an entire circumference of the outer part without interruption.

17. The brake booster as recited in claim 15, wherein the web the web extends over an entire circumference of the outer part with interruption.

18. The brake booster as recited in claim 15, wherein the outer part includes an axial stop, the inner part being axially secured in the form-locked manner between the axial stop and the bent holding section.

* * * * *